United States Patent
Schmitt et al.

(10) Patent No.: US 8,750,294 B2
(45) Date of Patent: Jun. 10, 2014

(54) CIRCUIT ARRANGEMENT FOR SIGNAL PICK-UP AND SIGNAL GENERATION AND METHOD FOR OPERATING THIS CIRCUIT ARRANGEMENT

(75) Inventors: Stephen Schmitt, Nuertingen (DE); Juergen Hanisch, Bempflingen (DE)

(73) Assignee: Robert Bosch GmbH, Stuttgart (DE)

( * ) Notice: Subject to any disclaimer, the term of this patent is extended or adjusted under 35 U.S.C. 154(b) by 765 days.

(21) Appl. No.: 12/669,692

(22) PCT Filed: Aug. 8, 2008

(86) PCT No.: PCT/EP2008/060493
§ 371 (c)(1),
(2), (4) Date: Jan. 19, 2010

(87) PCT Pub. No.: WO2009/040179
PCT Pub. Date: Apr. 2, 2009

(65) Prior Publication Data
US 2010/0195670 A1    Aug. 5, 2010

(30) Foreign Application Priority Data
Sep. 20, 2007    (DE) .......................... 10 2007 044 803

(51) Int. Cl.
*H04L 12/50* (2006.01)
*H04Q 11/00* (2006.01)
*G06F 13/14* (2006.01)

(52) U.S. Cl.
USPC .............. 370/362; 370/378; 710/58; 710/305

(58) Field of Classification Search
USPC ......... 370/498, 357, 360, 362, 363, 364, 375, 370/378; 700/2; 710/58–61, 104, 305–316
See application file for complete search history.

(56) References Cited

U.S. PATENT DOCUMENTS

| 5,129,089 | A | * | 7/1992 | Nielsen ......................... 710/200 |
| 5,701,421 | A | * | 12/1997 | Miller et al. .................. 710/305 |
| 5,848,247 | A | * | 12/1998 | Matsui et al. ................. 710/104 |
| 6,813,674 | B1 | * | 11/2004 | Velasco et al. ................ 710/311 |
| 2002/0059004 | A1 | * | 5/2002 | Matsui ............................ 700/39 |
| 2004/0107323 | A1 | * | 6/2004 | Matsuura et al. ............. 711/150 |
| 2004/0148153 | A1 | * | 7/2004 | Beletsky et al. ................ 703/27 |
| 2007/0132316 | A1 | * | 6/2007 | Joos et al. ....................... 307/31 |
| 2010/0195670 | A1 | * | 8/2010 | Schmitt et al. ................ 370/498 |

FOREIGN PATENT DOCUMENTS

| JP | 6274415 | 9/1994 |
| JP | 2000-242613 | 9/2000 |
| JP | 2007-108993 | 4/2007 |
| JP | 2007-207121 | 8/2007 |
| WO | WO 89/06011 | 6/1989 |

OTHER PUBLICATIONS

International Search Report, PCT International Patent Application No. PCT/EP2008/060493, dated Apr. 28, 2009.

* cited by examiner

*Primary Examiner* — Benjamin H Elliott, IV
(74) *Attorney, Agent, or Firm* — Kenyon & Kenyon LLP

(57) ABSTRACT

A circuit arrangement for signal pick-up and signal generation and a method for operating this circuit arrangement. The circuit has at least one timer module for providing a time basis to a plurality of time control modules connected to it, and has a time routing unit, which is connected to it for the interconnection of the named modules and their signals.

11 Claims, 4 Drawing Sheets

CIRCUIT ARRANGEMENT FOR SIGNAL PICK-UP AND SIGNAL GENERATION AND METHOD FOR OPERATING THIS CIRCUIT ARRANGEMENT

FIELD OF THE INVENTION

The present invention relates to a circuit arrangement for signal pick-up and signal generation, as well as a method for operating this circuit arrangement.

BACKGROUND INFORMATION

Such circuits may be implemented, for example, as timer modules in microcontrollers. The modules are developed as individual components, in this instance, or as peripheral modules of the controller, which provide more or less powerful functions for signal pick-up and signal generation in dependence, as a function of time, of one or more clock pulses.

At the present time, different concepts for implementing timers are being used. In this connection, one may basically distinguish between complex and less complex implementations.

In the category of less complex timers, one might mention MTU (multi-function timer pulse unit) of Renesas™ controllers SH7741-HD6417641. It supplies the user with 5 time control units that are connected to 16 I/O pins. Time control units should be understood to mean modules which change their inner state, such as a counter, as a function of one or more clock pulses and/or input signals, store points in time of one or more time bases and/or output signal characteristics. From the MTU, for example, 8 clock pulse sources may be evaluated and patterns may be picked up. In addition, an up to 12-phase PWM (pulse width modulated) signal is able to be generated. PWM signals are input or output signals that change their signal level after certain signal durations which, among other things, are able to be determined by the time control units. In the case of a 12-phase PWM signal, for example, up to 12 different length signal levels are active on one line. Using these modules, only limited timer functions are able to be produced on few I/O pins, which, it is true, does make the controllers cost-effective, but requires much software interaction in order to implement complex applications.

Besides these simple timer modules, there are complex ones, including, for instance, eTPU (enhanced time processing unit) from Freescale™ and GPTA (general purpose timer array) from Infineon. Besides dedicated timer hardware, eTPU offers a programmable microprocessor. The ePTU has 32 time control units that are equipped with dedicated hardware for signal pick-up and signal generation. Each channel is connected to dedicated I/O pins. The broadening of the resources is reached, in the case of Freescale, in that the complete unit of the 32 time control units is doubled together with the microprocessor. GPTA constitutes a different concept for a complex module. It represents a pure hardware implementation of a timer module. The control software runs either on the TriCore™ microcontroller or on its coprocessor PCP (peripheral control processor). Besides hardware for signal pick-up and signal generation, the GPTA has modules for filtering and generating digital clock pulses, and the individual units are able to work with up to 8 clock pulse sources. With regard to the units of the GPTA, one is able to distinguish between 32 GTC's (global timer cells) and 63 LTC's (local timer cells), which are each applied in an array. In an array, the elements lie one behind the other, and are each able to communicate with their predecessor and their successor. The first element in an array is only able to communicate with its successor, and the last element only with its predecessor. GTC's are based on two global 24-bit time bases, and are able to be connected to their respective neighbors in the array and to I/O pins. The assignment of I/O pins and GTC's takes place over a multiplexer circuit. Multiplexers are networks which, based on control lines, switch one or more input signals to one or more output signals. Because of that, each GTC is able to be connected to each I/O pin. The LTC's are 16-bit based, and, in contrast to GTC's, additionally react to the eight clock pulse sources. The LTC's are able to pick up and compare signals and function as counters. The control of I/O pins by the LTC's is also implemented again via a multiplexer.

Because of their limited functionalities, the simpler timer modules are cost-effective to implement, but they do require a great deal of computing power of the microcontroller for implementing complex functionalities. On the other hand, the more complex timer modules are costly, and are scalable only in limited fashion. Thus, in the case of Freescale, the entire eTPU, and in the case of Infineon, the entire GPTA or the LTC array is doubled for the purpose of having more resources available. This may lead to some resources not being used to capacity. In the case of the eTPU, the I/O pins are in addition assigned to time control units. The GPTA gets around these restrictions by multiplexing the I/O pins onto the GTC's and the LTC's. This implementation, however, requires very many logic resources. Furthermore, the GTC's and the LTC's, because of their geographic arrangement in an array, are only able to communicate directly with neighboring cells in order to generate a complex PWM signal, for example.

SUMMARY

It is an object of the present invention to provide a circuit arrangement, for signal pick-up and signal generation, which permits great scalability, communications flexibility and processing speed, and which is also simple and cost-effective to implement.

From the device point of view, this object is attained by a circuit arrangement which includes at least one timer module for providing a time base at a plurality of time control modules connected to it, and a time routing unit connected to it for connecting up the modules named and their signals.

The term signal should be understood to mean any type of representing data by the value or value curve of a physical variable, in this context. By contrast, in the following, the term data should describe the elements of the information shown in recognizable form, which are able to be processed in systems.

One point of the circuit arrangement according to the present invention is its flexible connection structure. The central element of this structure is the time routing unit or router, to which flexible modules are able to be connected. The router takes care of the connecting up of the modules and their signals. Since the number of modules may vary dependent on requirements, a particularly fine-grained scalability of the circuit is possible. On the other hand, it is possible to interconnect the I/O pins and the time control units without needing a resource-intensive multiplexer circuit for this. Thus, in contrast to GPTA, the multiplexer for the control of the I/O pins may be replaced by the router. The individual modules may then flexibly communicate with one or more I/O modules via this router. Because of the router, in addition, no timer cells have to be used any more as routing resources to obtain a flexible interconnection.

In one advantageous specific embodiment of the circuit, it is provided that the time routing unit is able to be adjusted with respect to the number of modules connected to it. Such a programmable central router makes possible a finer granularity and adaptability to the tasks set. By contrast, the eTPU is broadened by a whole microprocessor and 32 time control units and the GTPA by a complete module or an LTC array. Because of the lower number of interconnections resulting from this, costs may be saved.

The time routing unit preferably has a memory area for writing and for reading the data transmitted between the modules. This makes possible stopping the signals transmitted between modules, and thus a time-delayed, e.g., cyclical operation of the modules by the router. The passing on of the data to the respectively addressed module may, however, take place in priority-controlled manner, so as to achieve an optimization of the communications.

One especially simple storage is achieved by the time routing unit including a fixed writing address in the memory area, for each connected module. As a function of the size of the memory, additional modules may thereby be connected in a particularly simple manner, without having to change the memory subdivision with respect to modules that have already been connected.

In this context, in a preferred manner, the memory area of the time routing unit may have memory locations which include a fixed value or no available data. This ensures that, when there is a system reset, the connected modules are in a specified state.

In order to analyze and manipulate the memory area of the time routing unit, it is advantageous if an interface is provided for a debugger. This is preferably connected to the internal bus of an overall system which includes the circuit arrangement. This makes the memory area accessible via the interface to this system.

In one further advantageous specific embodiment of the circuit, it is provided that, on timer modules or time control modules, a read address, for data to be read at the time routing unit, be adjustable via a register of the module. This makes possible the flexible connection of the modules to the router, without the latter having to be reconfigured itself.

It is preferred, in this context, if the timer module or the time control module is developed for stopping its internal data processing in the case of data not being available at the time routing unit. This blocks the module, which only starts to run again when the data are available. This reduces the communications load within the circuit and increases its processing speed. In addition, a specified state of the modules at system reset is able to be adjusted.

The object mentioned at the outset is also attained by an operating method for the circuit arrangement in which the time routing unit communicates cyclically with the timer module and the time control module, the data being written by a sending module into a memory area, and being read out from this memory area by a receiving module.

One point of the method according to the present invention is the simple communications handling via the time routing unit, which permits any desired scalability of the circuit by the flexible connection of additional modules. Because of the interconnection via the router, a great communications flexibility between the modules is created at the same time. Since, in addition, a direct coupling of the modules via the router is always possible, great processing speed is ensured. At the same time, the method is simple and cost-effective to implement.

In one advantageous specific embodiment of the method, the timer and the time control modules stop their internal data processing in response to data not being available at the time routing unit. Because of this, on the one hand, the modules are able to be reset to a specified state when there is a system reset. On the other hand, this reduces the communications load in the circuit and increases its processing speed.

The circuit arrangement is preferably used, for instance, as a timer module for controlling the engine of a motor vehicle.

BRIEF DESCRIPTION OF THE DRAWINGS

The circuit and its operating method will now be explained in greater detail with the aid of an exemplary embodiment. Identical or identically acting parts are provided with the same reference symbols.

DETAILED DESCRIPTION OF EXAMPLE EMBODIMENTS

Figure 1:
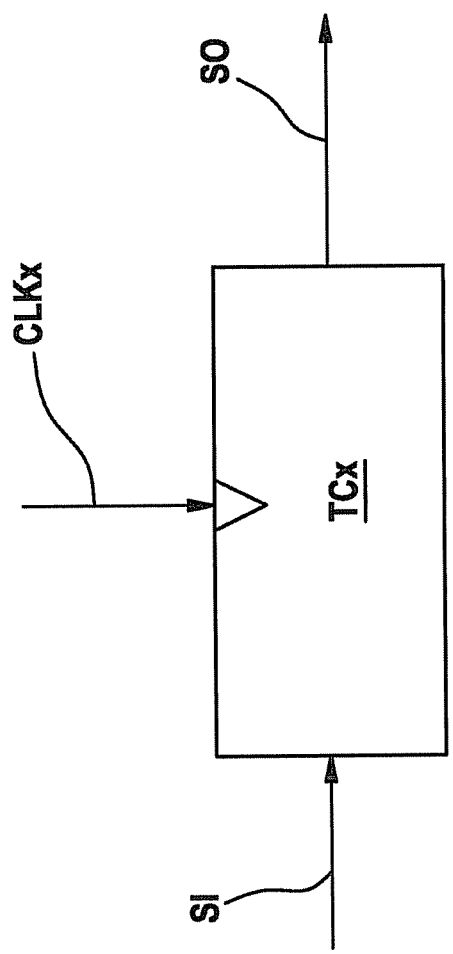
FIG. 1 shows a time control model to explain the principle of the time-dependent processing and the generating of signals in the related art.

FIG. 1 shows a time control module TCx (time controller) to explain the principle of the time-dependent processing and the generating of signals in the related art. In module TCx, in this instance, one or more input signals SI (signal in) are picked up and/or counted as a function of a clock pulse CLKx (clock), and as a function of that, one or more output signals SO (signal out) are generated.

Figure 2:
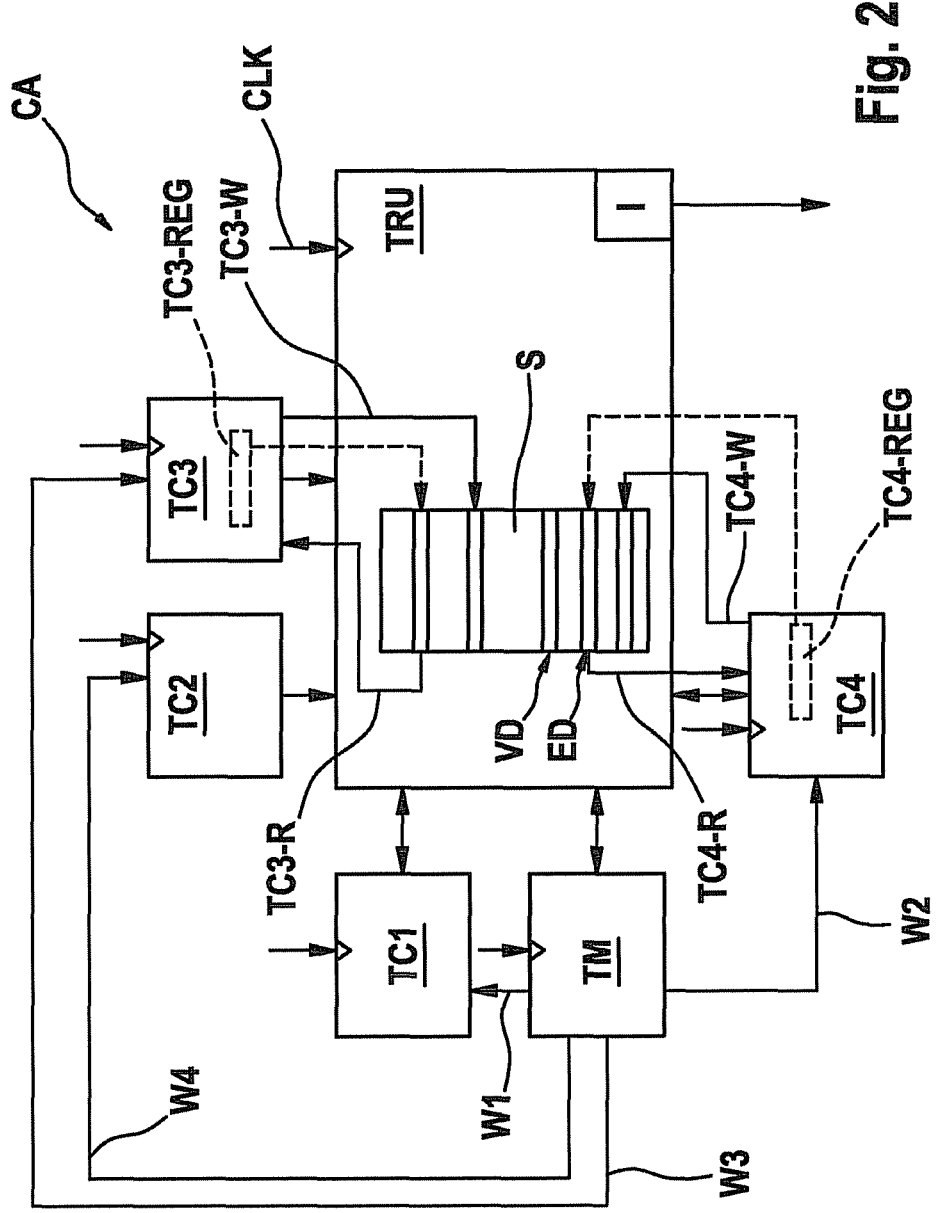
FIG. 2 shows a block diagram of a first specific embodiment of the circuit configuration according to the present invention, to explain its way of functioning.

FIG. 2 shows a block diagram of a first specific embodiment of the circuit arrangement CA (circuit arrangement) to explain its manner of functioning. One time routing unit (TRU) enables an efficient signal evaluation and/or generation based on one or more time bases TM (timer module), as shown in FIG. 1. Time bases TM are connected via fixed lines W1 . . . W4 (wiring) to time control modules TC1 . . . TC4 (time controller). In a time control module TC1 . . . TC4, the signal multiplexing described in FIG. 1 is undertaken. One or more time control units may also be interconnected in this instance, to process and/or output more complex signals.

This interconnection is performed by the central TRU and is shown in FIG. 2. There is a memory area S within the TRU, via which the data and the signals are able to be transferred between connected modules TC1 . . . TC4. The number of addressable modules depends on the size of memory S and the data rate at which the application has to be operated. The number of TRU memory addresses depends inversely on the number of connected modules TCx.

Each module that is connected to TRU has a fixed write address, such as TC3-W (for module TC3) or TC4-W (for module TC4). This write address can be written on if the memory location is empty. This may be signaled via a special flag. The read address is able to be adjusted in the respective module via a register, such as TC3-REG (for module TC3) or TC4-REG (for module TC4). Modules TC1 . . . TC4 are then cyclically operated by TRU, in that data or signals, that are to be written, are stored in memory area S, and available data from memory area S are forwarded, for instance, via address TC3-R (for module TC3) or TC4-R (for module TC4) to the respective module.

In the case of read accesses of a module TCx, two special memory locations of the TRU give a predefined value or no data. Thus, for example, memory location VD (value defined) supplies a fixed value and memory location ED (empty defined) supplies no available data. The two memory locations VD, ED are not applied in a module-specific manner, and are able to be addressed via the respective register of connected modules TCx, for instance, via TC3-REG or via TC4-REG. This ensures that modules TC1 . . . TC4 are in a defined state when there is a system reset. The modules block when no data are available and stop the internal processing. During a system reset, this is able to be achieved by reading memory location ED, which includes no data. Thus, read register TC4-REG of module TC4, for example, points to empty memory location ED, and, with that, blocks its execution.

For access to memory location S, which, for instance, is necessary for debugging the TRU, the TRU is equipped with an interface I (interface). In order to assure easy accessibility, this interface may be connected, for instance, to the internal bus of the overall system.

Figure 3:
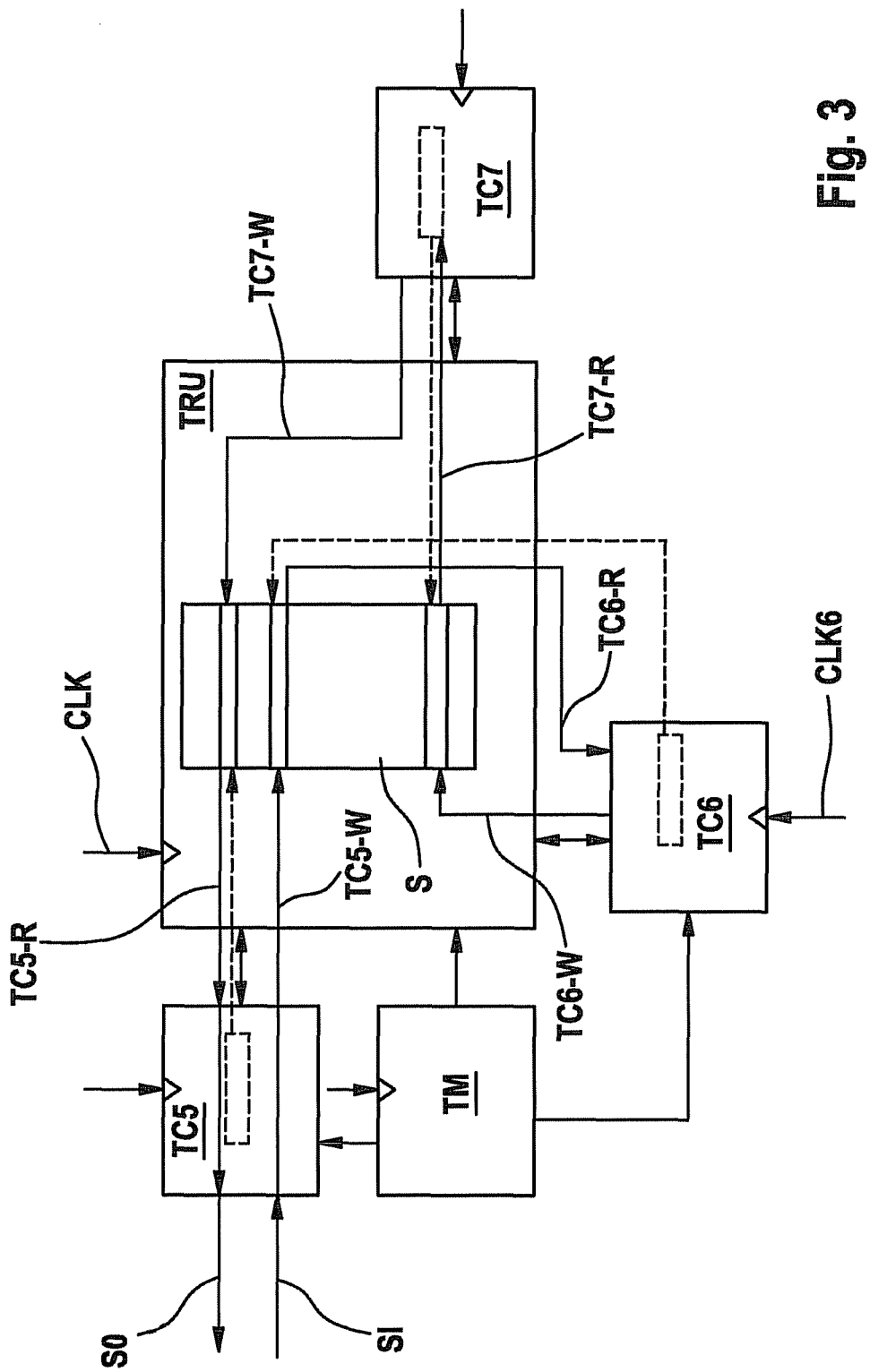
FIG. 3 shows a block diagram of a second specific embodiment of the circuit arrangement according to the present invention, to explain the signal multiplexing.

FIG. 3 shows a block diagram of a second specific embodiment of the circuit arrangement according to the present invention for explaining the signal multiplexing. In this instance, a signal processing path subject to time is shown by signal input SI and signal output SO. One module TC5 represents an I/O module in the example, to which an input pin and an output pin are connected. A module TC6 blocks until module TC5 has written a value to its memory address TC5-W. This value is then processed further by module TC6, which addresses memory location TC6-R. Module TC6 could, for example, count a counter as a function of a clock pulse CLK6, and then write a value to memory location TC6-W in response to a previously programmed counter reading. A module TC7, in turn, blocks on this memory location TC7-R and runs again as soon as a datum is available. After the expiration of a certain time span, an additional value is written to memory location TC7-W of module TC7. This memory location TC7-W is then read out again by module TC5 via TC5-R, and the level of the signal is output.

Certain temporal boundary conditions have to be satisfied for the abovementioned mechanism. The frequency of the TRU clock pulse depends on two factors. For one, it depends on the maximum frequency of a data flow or signal which have to be steered through the timer without processing, and for another, it depends on the maximum frequency of a data flow or signal which are processed by the module having the highest run time. The time $t_{TRU-cycle}$, that passes between two successive accesses of TRU to a module TC5 . . . TC7, is designated as a TRU cycle. In order for no datum to get lost, this TRU cycle has to be greater than the maximum frequency of the input signals and output signals SI and SO. For this, the number of clock pulses has to be determined that are necessary so that each of the connected modules TC5 . . . TC7 is able to access the TRU in read and write mode. The following equation is then given for the TRU cycle:

$$t_{TRU\_cycle} = \frac{\text{\# clock pulses}}{f_{system}}$$

From this, the required clock pulse frequency for the TRU may then be determined using the following inequalities:

$$f_{max} < \frac{1}{t_{Tru\_cycle}}$$

and thus:

$f_{system} > f_{max} * \text{\#clock pulses}$

If the modules TC5, TC6, TC7 and TM require, for instance, 3 clock pulses for reading and 2 clock pulses for writing data, then, in the worst case, 20 clock pulses are required for handling all modules through the TRU in one TRU cycle. In the case of a maximum possible frequency of input and output signals SI and SO of 1 MHz, TRU would have to be operated at a clock pulse of 20 MHz. This applies for the case in which the signals SI, SO are only routed through the circuit, but are not processed. If the data or signals have to be processed in a module TC5 . . . TC7, the processing time of module TCx has also to be considered, which requires most of the processing time. This factual situation is represented in FIG. 4.

Figure 4:
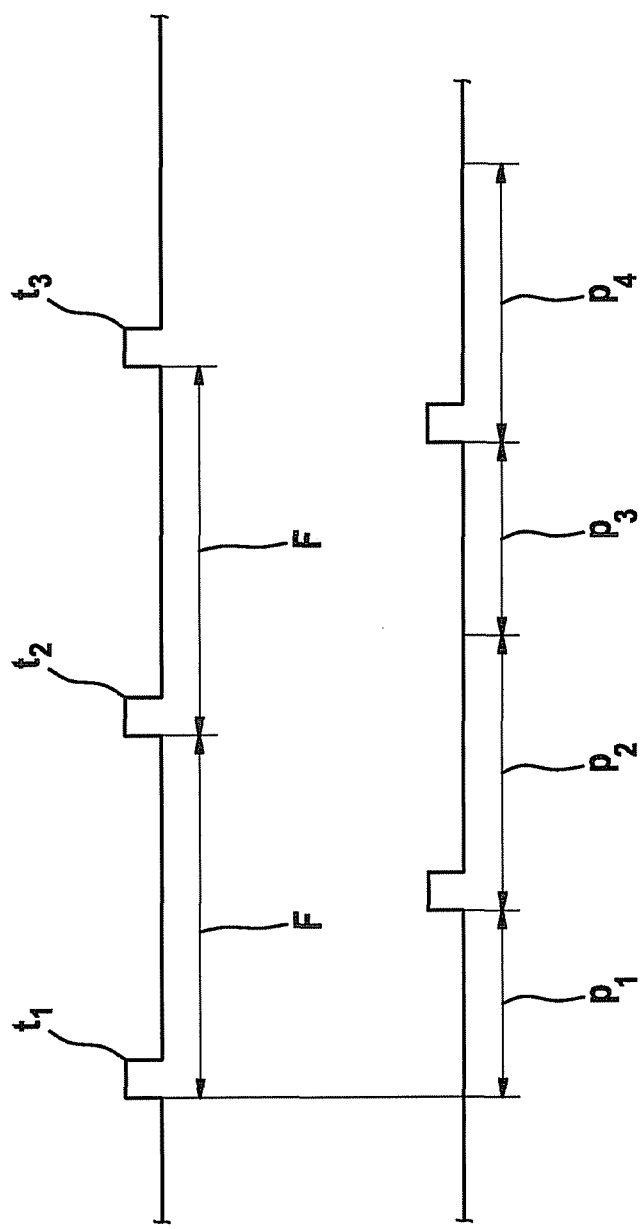
FIG. 4 shows a schematic representation of the signal processing subject to time in modules of a circuit arrangement according to the present invention.

FIG. 4 shows a schematic representation of the signal processing subject to time in modules TCx of a circuit arrangement according to the present invention. At times t1 . . . t3 (time), data and signals having a frequency F (frequency) run up against the input pins. In the worst case, TRU runs a cycle having a time period p1 (period), before a module TCx is able to read the data. Thereafter, in the worst case, it takes the time span p2+p3 until module TCx is able to write its data again to TRU. In this context, time span t2 represents the calculating time and time span p1 represents the time for a TRU cycle. From this, then, one is able to ascertain the required system clock pulse for the TRU, as follows:

$$t_{p2} = \frac{\text{\# clock pulses}_{calculation}}{f_{system}}$$

$$t_{p1} = \frac{\text{\# clock pulses}_{TRU-cycle}}{f_{system}}$$

$$t_F = \frac{1}{f_F}$$

$$2 * t_F > 2 * t_{p1} + t_{p2} \text{ and}$$

$$\frac{2}{f_F} > \frac{2 * \text{\# clock pulses}_{TRU-cycle}}{f_{system}} + \frac{\text{\# clock pulses}_{calculation}}{f_{system}} =$$

$$\frac{(2 * \text{\# clock pulses}_{TRU-cycle}) + \text{\# clock pulses}_{calculation}}{f_{system}}$$

This gives the system clock pulse:

$$f_{system} > f_F * \left( \frac{(2 * \text{\# clock pulses}_{TRU-cycle}) + \text{\# clock pulses}_{calculation}}{2} \right)$$

The TRU described here may, for instance, be used in a timer for engine control units. Based on the scalable and programmable architecture of the TRU, a circuit arrangement building up on this is configurable in an extremely flexible manner, is rapidly reacting, reliable and, in addition, is cost-effectively implementable.

What is claimed is:

1. A circuit arrangement for signal pick-up and signal generation, comprising:
    at least one timer module to provide a time basis to a plurality of time control modules connected thereto; and
    a time routing unit connected to the timer module and the time control modules, the time routing unit providing an interconnection of the time control modules and signals of the time control modules among the time control modules, wherein the signals of the time control modules include signals transmitted by the time control modules, and wherein the time routing unit has a memory area for writing and reading of data transmitted between the time control modules.

2. The circuit arrangement as recited in claim 1, wherein the number of the time control modules connected to the time routing unit is adjustable.

3. The circuit arrangement as recited in claim 1, wherein the memory area has memory locations which include a fixed value or no available data.

4. The circuit arrangement as recited in claim 1, wherein the time routing unit includes an interface for debugging and manipulating the storage area.

5. The circuit arrangement as recited in claim 4, wherein the interface is connected to an internal bus of an overall system which includes the circuit arrangement.

6. A circuit arrangement for signal pick-up and signal generation, comprising:
   at least one timer module to provide a time basis to a plurality of time control modules connected thereto; and
   a time routing unit connected to the timer module for interconnection of the time control modules and signals of the time control modules;
   wherein the time routing unit has a memory area for writing and reading of data transmitted between the time control modules;
   wherein for each of the timer module and the time control modules connected to the time routing unit, a fixed write address is provided in the memory area.

7. A circuit arrangement for signal pick-up and signal generation, comprising:
   at least one timer module to provide a time basis to a plurality of time control modules connected thereto; and
   a time routing unit connected to the timer module for interconnection of the time control modules and signals of the time control modules;
   wherein a read address for data to be read at the time routing unit is adjustable via a register of the module.

8. The circuit arrangement as recited in claim 7, wherein the time control module is adapted to stop internal data processing in response to non-available data at the time routing unit.

9. A method for operating a circuit arrangement for signal pick-up and signal generation, comprising:
   communicating, by a time routing unit, cyclically with a timer module and a time control module, wherein the timer module provides a time basis to the time control module connected thereto, and wherein the time routing unit is connected to the timer module and the time control modules, the time routing unit providing an interconnection of the time control modules and signals of the time control modules among the time control modules, wherein the signals of the time control modules include signals transmitted by the time control modules;
   writing data from at least one of the timer module and the time control module in a memory area of the time routing unit; and
   reading the data by at least one of the time control module and the timer module from the memory area of the time routing unit.

10. The method as recited in claim 9, further comprising:
    stopping, by the timer module and the time control module, internal data processing in response to non-available data at the time routing unit in the reading step.

11. A circuit arrangement for signal pickup and signal generation for controlling an engine of a motor vehicle, the circuit arrangement comprising:
    at least one timer module to provide a time basis to a plurality of time control modules connected thereto; and
    a time routing unit connected to the timer module and the time control modules, the time routing unit providing an interconnection of the time control modules and signals of the time control modules among the time control modules, wherein the signals of the time control modules include signals transmitted by the time control modules, and wherein the time routing unit has a memory area for writing and reading of data transmitted between the time control modules.

* * * * *